(12) United States Patent
Yoshida et al.

(10) Patent No.: US 6,572,928 B1
(45) Date of Patent: Jun. 3, 2003

(54) METHOD OF MANUFACTURING A CERAMIC ELECTRONIC PART

(75) Inventors: Kazuhiro Yoshida, Shimane-ken (JP); Kenichi Watanabe, Shiga-ken (JP); Junichi Oda, Izumo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/585,961

(22) Filed: Jun. 2, 2000

(30) Foreign Application Priority Data

Jun. 8, 1999 (JP) ............................. 11-160409

(51) Int. Cl.⁷ .............................. B05D 1/28; B05D 5/12
(52) U.S. Cl. .................... 427/428; 427/126.2; 427/286; 427/261; 427/77
(58) Field of Search .............................. 427/428, 126.2, 427/286, 261, 77, 430.01; 118/244, 258

(56) References Cited

U.S. PATENT DOCUMENTS

| | | | | |
|---|---|---|---|---|
| 4,214,943 A | * | 7/1980 | Stern | 156/504 |
| 4,603,060 A | * | 7/1986 | Mitsuda et al. | 427/115 |
| 4,752,027 A | * | 6/1988 | Gschwend | 228/180.2 |
| 5,348,611 A | * | 9/1994 | Lavrenge et al. | 156/571 |
| 5,364,014 A | | 11/1994 | Hamuro et al. | |
| 5,551,979 A | | 9/1996 | Shealey | |
| 6,214,118 B1 | * | 4/2001 | Obana et al. | 118/712 |

FOREIGN PATENT DOCUMENTS

| | | |
|---|---|---|
| EP | 0528484 | 2/1993 |
| JP | 400263409 | 9/1992 |
| JP | 900022843 | 1/1997 |

* cited by examiner

*Primary Examiner*—Michael Barr
(74) *Attorney, Agent, or Firm*—Keating & Bennett, LLP (57) ABSTRACT

A method of manufacturing a ceramic electronic part having a desired film thickness and external electrodes such that the part is manufactured without projections and depression of the surface thereof, includes applying an electrode paste of a prescribed thickness on the surface of the ceramic element. The electrode paste is applied by rotating a roller with the electrode paste on its peripheral surface, and by moving at least either one of the roller and the ceramic element in a prescribed direction so that the ceramic element moves relative to and tangentially of the roller in the direction opposite to the rotation of the roller with at least a part of the ceramic element dipped in the electrode paste applied on the peripheral surface of the roller.

7 Claims, 11 Drawing Sheets

METHOD OF MANUFACTURING A CERAMIC ELECTRONIC PART

BACKGROUND OF THE INVENTION

1. Field of the Invention

The present invention relates to a method of manufacturing a ceramic electronic part and, more specifically, the invention relates to a method of manufacturing a ceramic electronic part of a structure having an electrode disposed on the surface of a ceramic element.

2. Description of the Related Art

Figure 14:
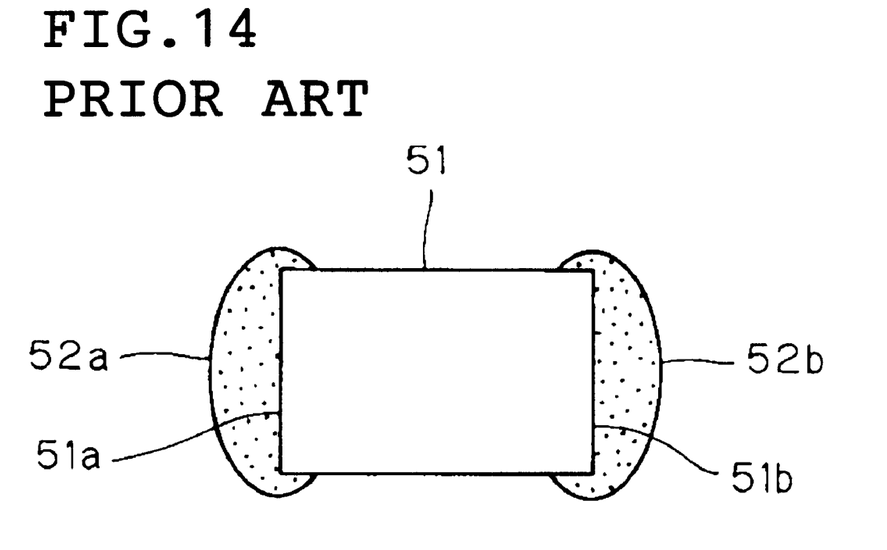
FIG. 14 is a cross-sectional view illustrating a ceramic electronic part manufactured by conventional method.

As shown in FIG. 14, for example, a method generally employed in manufacturing a ceramic electronic part of a structure having external electrodes 52*a* and 52*b* at the ends of a ceramic element 51 comprises the steps of applying an electrode paste on the ceramic element, and curing or baking it.

Figure 15A:
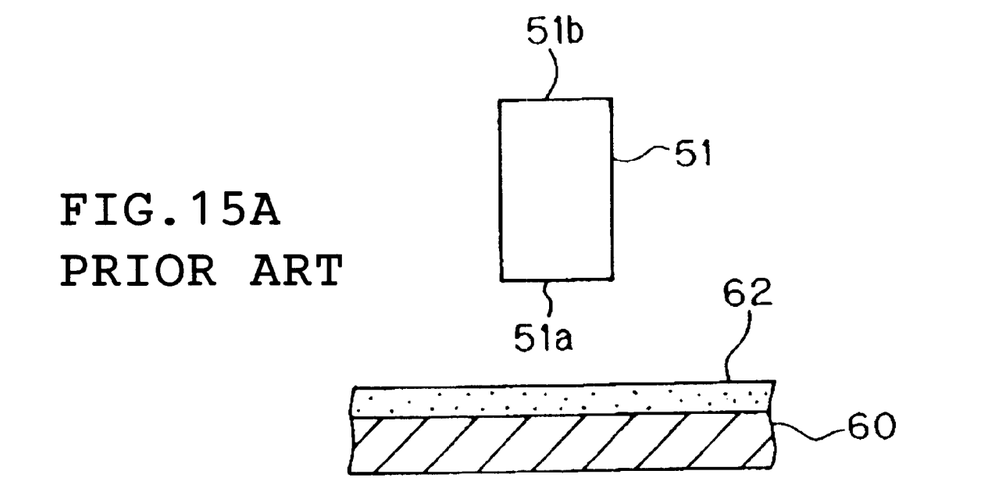
FIGS. 15A, 15B, 15C are views illustrating a conventional method of forming the external electrodes on a ceramic element.
Figure 15B:
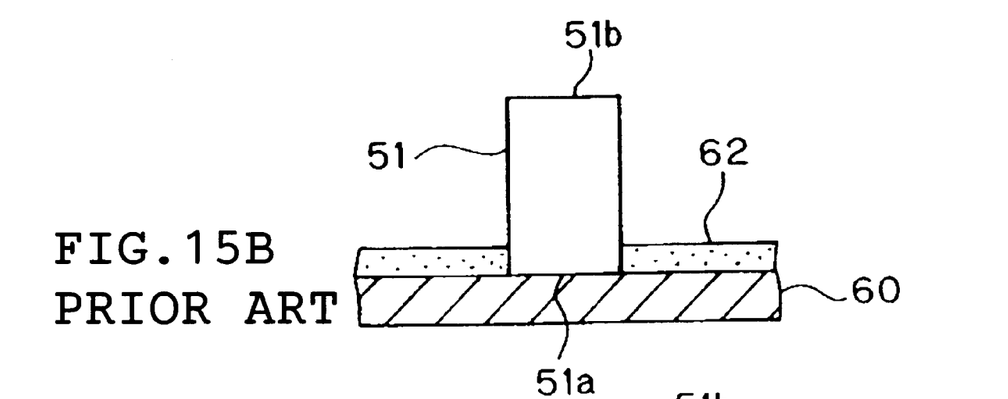
Figure 15C:
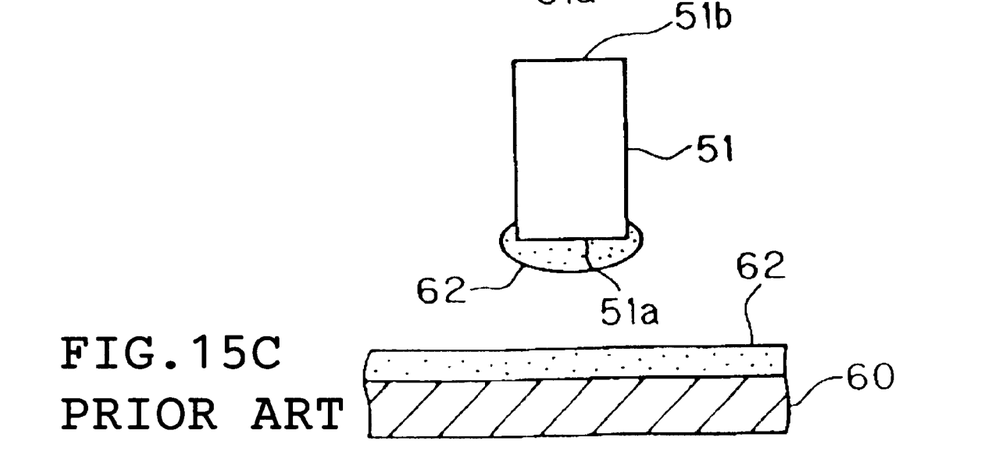

For example, this method, as shown in FIG. 15A, comprises the steps of applying an electrode paste 62 of a prescribed thickness including metal powder such as silver powder as a conductive ingredient on the surface plate 60, dipping one end (end surface) 51*a* of the ceramic element 51 into the electrode paste 62 as shown in FIG. 15B, raising the ceramic element 51 out of the electrode paste 62 as shown in FIG. 15C, applying the electrode paste 62 on the other end (end surface) 51*b* of the ceramic element 51 (not shown), and thermosetting or baking the electrode paste to form external electrodes 52*a,* 52*b* (FIG. 14).

However, the conventional method described above has recognized disadvantages in that applying the electrode paste 62 of a uniform thickness on the end surface of the ceramic element 51 is difficult, and that horn-like projections (not shown) may be formed on the surface of the external electrodes 52*a,* 52*b* (FIG. 14) caused by cobwebbings of the electrode paste 62 generated at the time the ceramic element 51 is raised from the electrode paste 62, and specifically, the bigger the size of the ceramic element is, the more noticeable such tendency would be.

The conventional method described above has further recognized disadvantages in that in order to control the thickness or the configuration of application of an electrode paste, a precise control of the viscosity of the electrode paste and adjustment of speed or the number of times of raising action, which may affect manufacturing capacity, may be required.

In addition, in case of manufacturing electronic parts of the type that leads and/or metal plate terminals to be mounted on a substrate are attached on the external electrode, projections and depressions formed on the surface of the external electrode may affect the stability of connection between them, and thus further precise process control may be required, which may interfere with the improvement of productivity.

SUMMARY OF THE INVENTION

Accordingly, it is an object of the present invention to overcome the problems described above and to present a method of manufacturing a ceramic electronic part characterized in that the electrode paste can be applied uniformly onto the ceramic element, and that the ceramic electronic part provided with a film of a uniform thickness required for maintaining its performance and external electrodes having highly precise configuration without any projection or depression on its surface is efficiently manufactured.

In order to achieve the object described above, the present invention discloses a method of manufacturing a ceramic electronic part of a structure having an electrode disposed on the surface of ceramic element, comprising the steps of: rotating a roller having an electronic paste to be applied on the peripheral surface thereof to form a thick film electrode at a prescribed speed; dipping at least a part of a ceramic element into the electrode paste applied on the peripheral surface of the rotating roller; and moving the ceramic element being dipped in the electrode paste relative to and tangentially of the roller in the direction opposite to the rotation of the roller.

Rotating the roller having an electrode paste to be applied on the peripheral surface thereof to form a thick film electrode and moving the ceramic element relative to and tangentially of the roller in the direction opposite to the rotation of the roller with at least a part of the ceramic element being dipped in the electrode paste on the peripheral surface of the roller ensures that the electrode paste of a prescribed thickness is applied onto the surface of the ceramic element.

In other words, according to the method of manufacturing a ceramic electronic part of the present invention, in the step of moving the ceramic element relative to and tangentially of the roller in the direction opposite to the rotation of the roller, (1) the electrode paste on the peripheral surface of the roller is sheared when the ceramic element comes closest to the roller, and then the electrode paste is transferred onto the ceramic element;

(2) thereafter, the transferring point moves tangentially as the ceramic element moves relative to the roller, so that the electrode paste does not undergo any tensile force during transferring operation and thus the configuration of applied electrode paste is stabilized; and (3) though a tensile force is exerted on the electrode paste at the time the ceramic element comes off the roller, the electrode paste is torn instantaneously and thus generation of cobwebbings is suppressed because the direction of movement of the ceramic element is opposite to that of the rotation of the roller, or if generated, most of them are taken up by the roller without adversely affecting the configuration of the electrode paste applied on the ceramic element, and consequently, application of an electrode paste of a prescribed thickness without forming projections and depressions on the surface can be achieved.

The method of manufacturing a ceramic electronic part according to the second aspect of the present invention is characterized in that grooves are formed on the peripheral surface of the roller.

By employing a roller having grooves on the peripheral surface thereof, the prescribed thickness of the electrode paste can be held on the peripheral surface of the roller, and a uniform thickness of the electrode paste may be applied quickly on the surface of the ceramic element, and consequently, by thermosetting or baking the electrode paste applied thereon, a ceramic electronic part with high dimensional precision may be manufactured efficiently.

The method according to the third aspect of the present invention is characterized in that the type of grooves formed on the peripheral surface is one of;

(a) a plurality of grooves disposed parallel to the periphery of the roller;

(b) a plurality of grooves disposed parallel to the axis of the roller; and (c) a plurality of grooves disposed parallel to the periphery of the roller and a plurality of grooves disposed parallel to the axis of the roller formed in a grid pattern.

By employing a roller provided on its peripheral surface with grooves of the type (a), (b), or (c), the electrode paste of a prescribed thickness can be held on the peripheral surface of the roller and a uniform thickness of the electrode paste can be applied on the ceramic element, which makes the present invention effective.

The method of manufacturing a ceramic electronic part according to the fourth aspect of the present invention is characterized in that at least either one of the roller and the ceramic element is moved in the prescribed direction so that the ceramic element moves relative to and tangentially of the roller in the direction opposite to the rotation of the roller.

As a method to move the ceramic element relative to and tangentially of the roller in the direction opposite to the rotation of the roller, either one of the roller and the ceramic element may be moved, or both of the roller and the ceramic element may be moved.

The method of manufacturing a ceramic electronic part according to the fifth aspect of the present invention is characterized in that the relation between the velocity of the movement of the ceramic element relative to and tangentially of the roller in the direction opposite to the rotation of the roller V1 and the peripheral speed of the rotation of the roller V2 satisfies the inequality; V1<V2.

When the relation between the velocity of the movement of the ceramic element relative to and tangentially of the roller in the direction opposite to the rotation of the roller V1 and the peripheral speed of the rotation of the roller V2 satisfies the condition of V1<V2, the procedures of the present invention such as: shear of the electrode paste on the peripheral surface of the roller; transfer of the electrode paste to the ceramic element as described in (1); an improvement in stability of the configuration of applied electrode paste by the relative movement of the ceramic element without exerting a significant tensile force onto the electrode paste as described in (2), instantaneous tearing-off of the electrode paste at the time the ceramic element comes off the roller, and taking up of the cobwebbings onto the roller as in (3) are achieved without fail, which makes the present invention effective.

The method of manufacturing a ceramic electronic part according to the sixth aspect of the present invention is characterized in that a prescribed clearance is provided between the ceramic element and the peripheral surface of the roller, so that the ceramic element and the peripheral surface of the roller do not come in contact with each other when a prescribed portion of the ceramic element is dipped into the electrode paste applied on the peripheral surface of the roller.

By preventing the ceramic element and the peripheral surface of the roller from coming in contact with each other when a prescribed portion of the ceramic element is dipped into the electrode paste on the peripheral surface of the roller, occurrence of chippings on the ceramic element can be prevented, and thus the degree of effect exerted when chippings are mixed into the electrode paste can be alleviated.

BRIEF DESCRIPTION OF THE DRAWINGS

Other features and advantages of the present invention will become apparent from the following description of the invention which refers to the accompanying drawings.

DESCRIPTION OF THE PREFERRED EMBODIMENT

Referring now to the embodiments of the present invention, the characteristics thereof will be described further in detail.

(Embodiment 1)

Figure 1:
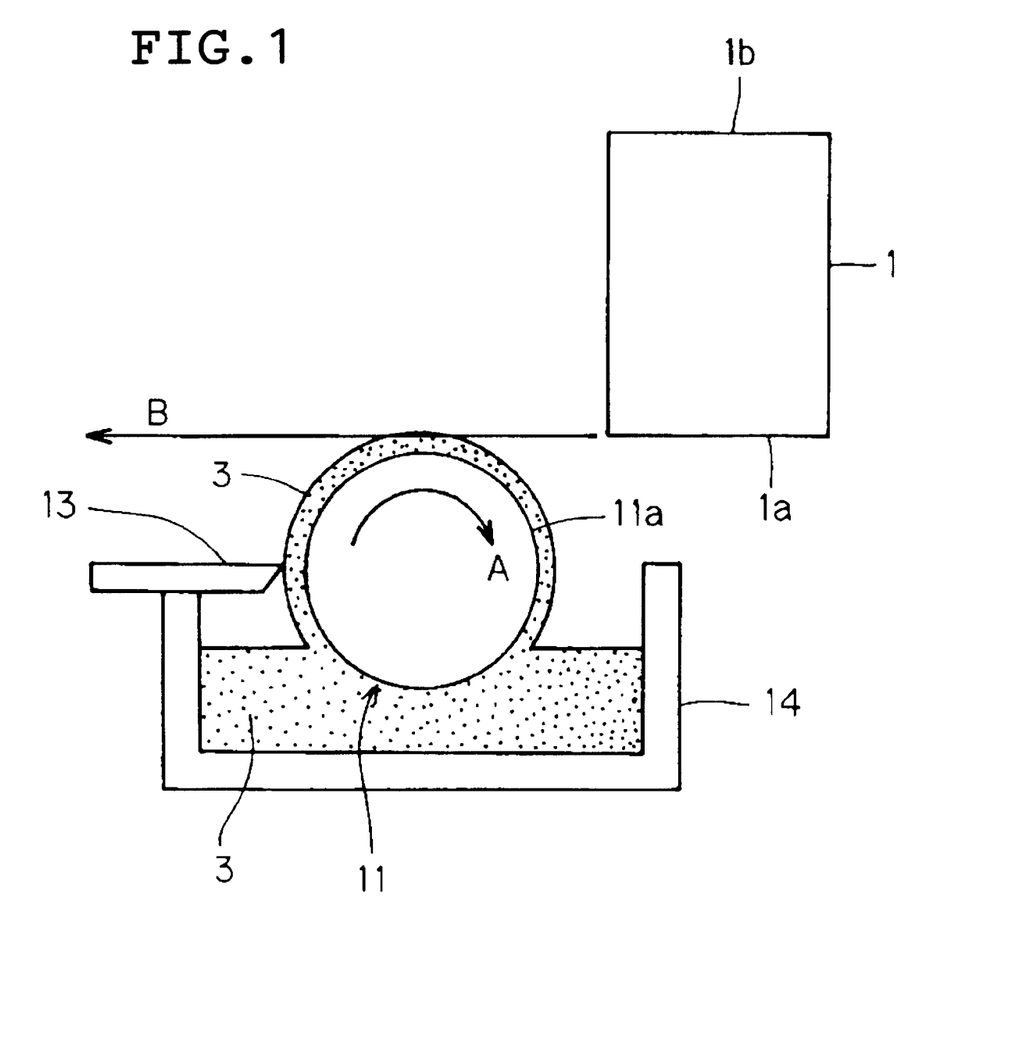
FIG. 1 is a view illustrating the principal portion of the conductive paste applicator used for carrying out the method of manufacturing a ceramic electronic part according to an embodiment (Embodiment 1) of the present invention.
Figure 5A:
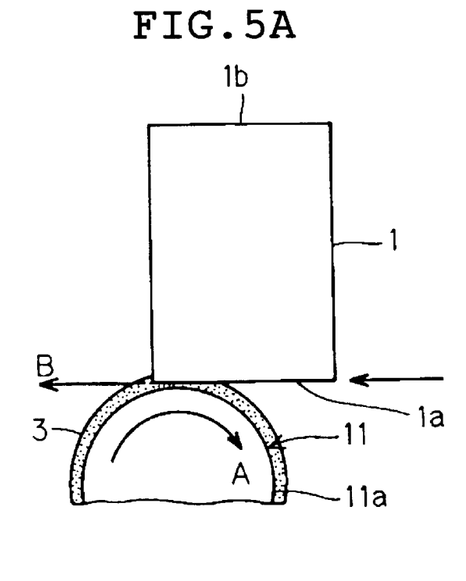
FIGS. 5A, 5B, and 5C are views illustrating a series of processes where the electrode paste is being applied on the ceramic element.
Figure 5B:
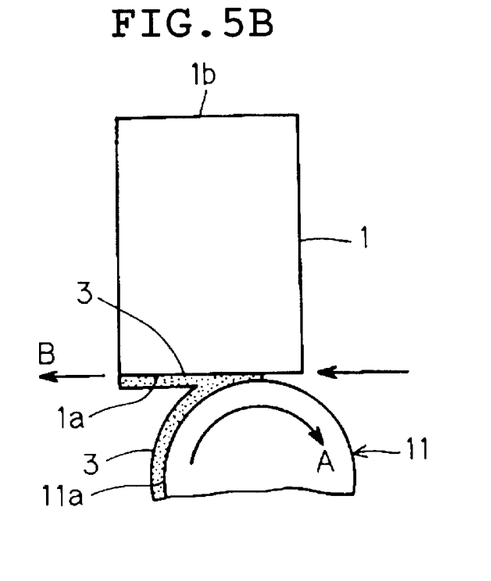

FIG. 1 is a view illustrating a principal part of the conductive paste applicator used to carry out the method of manufacturing a ceramic electronic part according to an embodiment (Embodiment 1) of the present invention, and FIGS. 5A and 5B are views illustrating a step of applying the electrode paste on the ceramic element.

Figure 6:
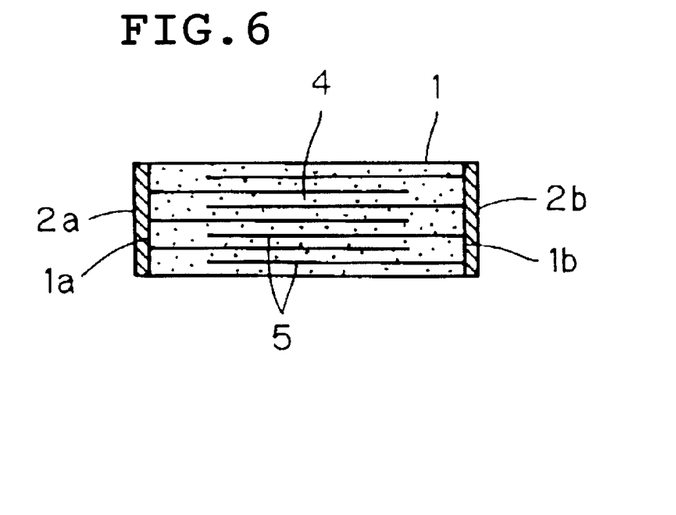
FIG. 6 is a cross sectional view illustrating a ceramic electronic part manufactured by the method of manufacturing a ceramic electronic part according to Embodiment 1 of the present invention.

In Embodiment 1, as shown in FIG. 6, descriptions are made with respect to manufacturing a ceramic electronic part (monolithic ceramic capacitors) provided with a pair of external electrodes 2a, 2b disposed on both end surfaces 1a and 1b of the ceramic element 1 having a structure such that internal electrodes 5 are opposed with each other via ceramic layers 4 and extend alternately to the end surfaces of the different side so as to establish electric conductivity between the external electrodes and the internal electrodes.

In Embodiment 1, an applicator is used in order to form the external electrodes 2a and 2b, and that applicator comprises, as shown in FIG. 1, a roller 11 including electrode paste 3 applied on the peripheral surface 11a thereof, a blade 13 for spreading the electrode paste 3 attached on the peripheral surface 11a of the roller equally in thickness, a paste bathtub 14 containing the electrode paste 3 which is to be attached on the peripheral surface 11a by rotating the roller 11 with the lower portion being dipped in the electrode paste 3.

Figure 2:
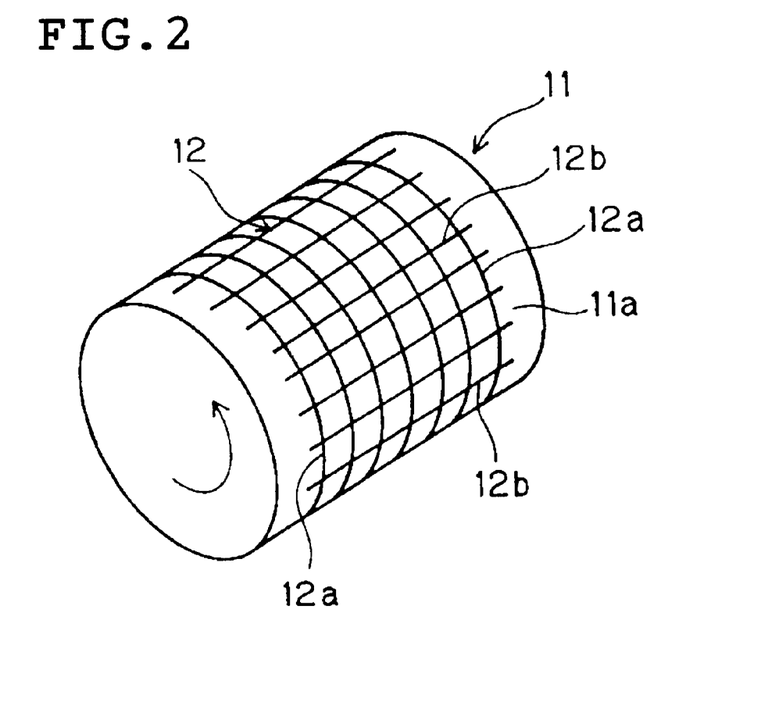
FIG. 2 is a view illustrating patterns of grooves disposed on the peripheral surface of the roller used in a step of the method of manufacturing a ceramic electronic part according to Embodiment 1 of the present invention.
Figure 3:
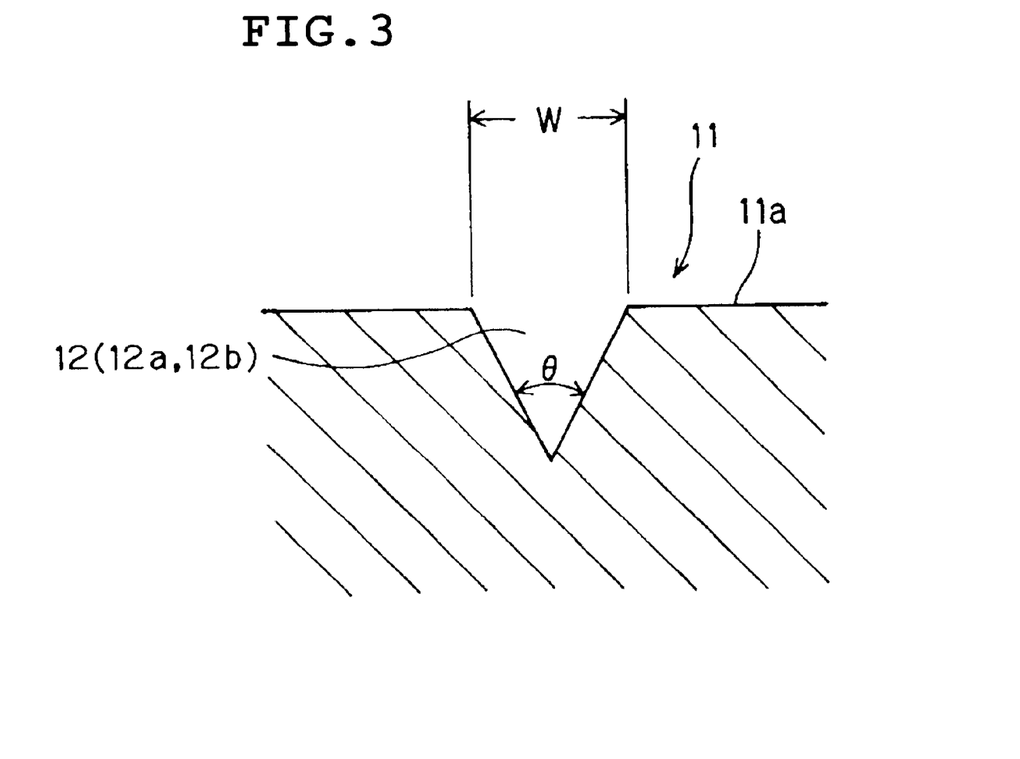
FIG. 3 is a view illustrating a cross-sectional configuration of the groove formed on the peripheral surface of the roller used in a step of the method of manufacturing a ceramic electronic part according to Embodiment 1 of the present invention.

As shown in FIG. 2, in this embodiment, the roller 11 has a plurality of grooves 12a disposed parallel to the periphery and a plurality of grooves 12b disposed parallel to the axis formed in a grid pattern. The grooves 12a and 12b formed on the peripheral surface 11a of the roller 11 have a V-shaped cross section, as shown in FIG. 3, wherein a width W is 0.4 mm and an angle is 60.

The reason why grooves 12 (12a, 12b) having a V-shaped configuration are employed is that the electrode paste 3 can be taken out easily. The grooves 12a and 12b described above may be formed easily by machining such as lathe machining. Other methods may be employed as well.

When determining the configuration of the grooves 12, it is preferable to consider the thickness of the electrode paste 3 applied on the end surfaces 1a and 1b of the ceramic element 1 (thickness of the film), the size of the area to be applied, configuration of application, the physical properties of the electrode paste to be used (viscosity, particle diameter of metal powder which employed as a conductive ingredient, or thixo property).

Figure 4A:
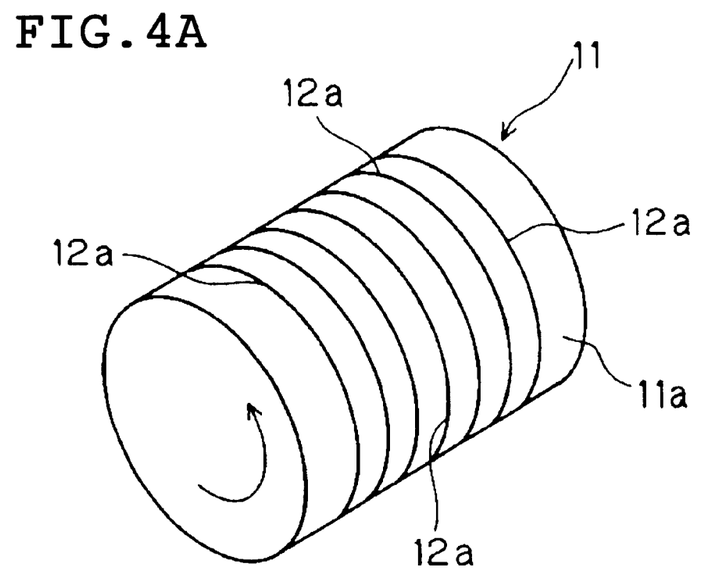
FIGS. 4A and 4B are views of alternative rollers which may be used in the method of manufacturing a ceramic electronic part of the present invention.
Figure 4B:
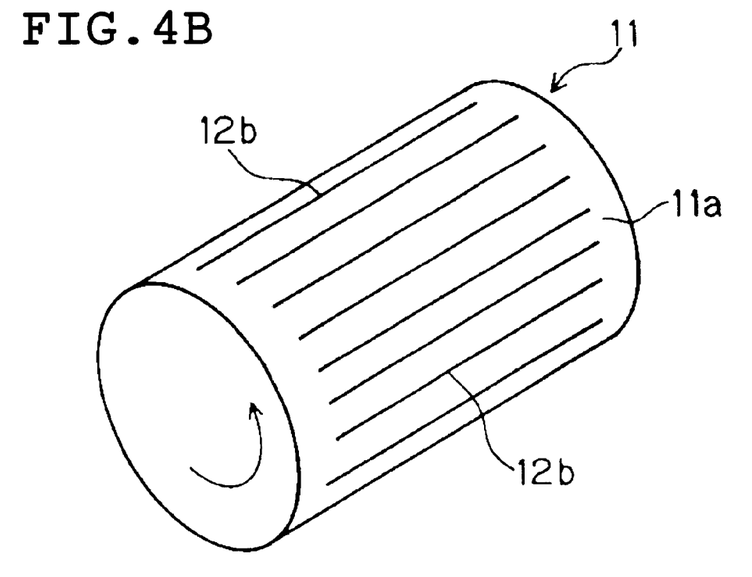

Although the roller 11 having grooves 12 formed in a grid pattern is employed in this embodiment, the roller 11 as shown in FIG. 4A which has only a plurality of grooves 12a parallel to the direction of periphery, or the roller 11 as shown in FIG. 4B which has only a plurality of grooves 12b parallel to the direction of the axis may be used.

As a material of the roller 11, though there is no specific limitation, metal or resin which has an affinity for the electrode paste 3 and which is not subject to deformation, swelling, or corrosion due to a solvent contained in the electrode paste is preferable.

In addition, this applicator has a roller drive mechanism for rotating the roller 11, a holding mechanism for holding the ceramic element 1, and a mobile mechanism for moving the ceramic element 1 with respect to the roller 11 by moving the holding mechanism, which are not shown in the figures.

The mobile mechanism used herein is so constructed as to move the ceramic element 1 relative to and tangentially of the roller 11 in the direction (the direction shown by the arrow B) opposite to the rotation (the direction shown by the arrow A) of the roller at the speed of V1 which is slower than the rotational speed of the roller 11 V2 with a part of the ceramic element 1 (the end surface 1a in FIG. 5) dipped in the electrode paste 3 applied on the peripheral surface 11a of the roller.

Now, the method of applying the electrode paste on the ceramic element by the use of the applicator will be described.

(1) In the first step, as shown in FIG. 1, the electrode paste 3 is applied on the peripheral surface 11a of the roller 11 by rotating the roller 11, and is spread uniformly by means of the blade 13 to obtain the film of a prescribed thickness.

(2) In the next step, the ceramic element 1 is moved tangentially in the direction opposite to the rotation (the direction shown by the arrow A of the roller (The direction shown by the arrow B) at the speed V1 which is slower than the peripheral speed V2 of the roller 11, and the end surface 1a which is one of end surfaces 1a and 1b on which the external electrodes 2a, 2b (FIG. 6) are to be formed is dipped in the electrode paste 3 attached on the peripheral surface 11a of the roller 11 keeping it from contact with the peripheral surface 11a of the roller 11.

(3) In the next step, as shown in FIG. 5B, the electrode paste 3 is applied on the end surface 1a of the ceramic element 1 by continuously moving the ceramic element 1 tangentially (the direction shown by the arrow B). In this invention, the concept, "moving tangentially of the roller in the direction opposite to the rotation of the roller" means, as described above, to move the ceramic element 1 linearly along the tangent in the direction (the direction shown by the arrow B) opposite to the direction of rotation of the roller 11(the direction shown by the arrow A). The term "move or moving" used here is based on the relative position between the ceramic element 1 and the roller 11.

Figure 5C:
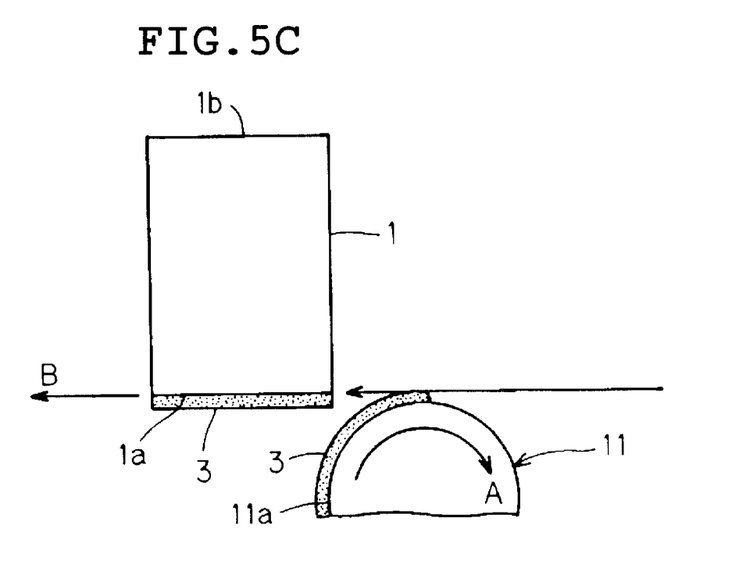

(4) By moving the ceramic element 1 further along the direction of the tangent (the direction shown by the arrow B), as shown in FIG. 5C, the ceramic element 1 reaches the point where it comes off the roller 11 and tensile force is exerted on the electrode paste 3. Since the direction of movement of the ceramic element 1 is opposite to the direction of rotation of the roller 11, the electrode paste 3 is torn instantaneously and thus generation of cobwebbings is suppressed, or if generated, most of them are taken up by the roller 11 so that the application of the electrode paste 3 onto the end surface 1a of the ceramic element 1 will be completed without generating any significant cobwebbings.

The thickness of the electrode paste 3 may be adjusted to a prescribed value by:

(i) relation between the speed of the ceramic element 1 relative to the roller 11 and the speed of rotation of the roller 11; or (ii) the depth of dipping of the ceramic element 1 into the electrode paste. Especially, (ii) is proportional to the thickness of application. In the method of the present invention, since transfer (application) is carried out by shearing the conductive paste 3, the viscosity of the electrode paste have little effect on the thickness of the application, which is proved by experiment.

When the electrode paste 3 is applied on the ceramic element 1, it is also applicable to repeat the procedures from (1) to (4) several times with the same roller, or to use a plurality of rollers with the electrode paste of the different thickness attached respectively in advance and apply the electrode paste several times on the ceramic element.

(5) Thereafter, the ceramic element 1 is reversed, which is not shown in the figure specifically, and the electrode paste is applied on the end surface 1b (FIG. 6) of the other side according to the same procedures as ones shown above.

In the case where the electrode paste is applied several times on the end surface of the ceramic element repeatedly, the electrode paste may be applied on the same end surface repeatedly, or may be applied on the both end surfaces alternately.

(6) In the next step, the ceramic element having the electrode paste applied on both end surfaces 1a, 1b is heat treated to bake the electrode paste to form a ceramic electronic part (monolithic ceramic capacitors) as shown in FIG. 6.

While the ceramic element 1 is moved in Embodiment 1, since the positional relationship between the ceramic element and the roller is relative, it is also applicable to move only the roller without moving the ceramic element, or to move the ceramic element and the roller simultaneously.

Figure 7:
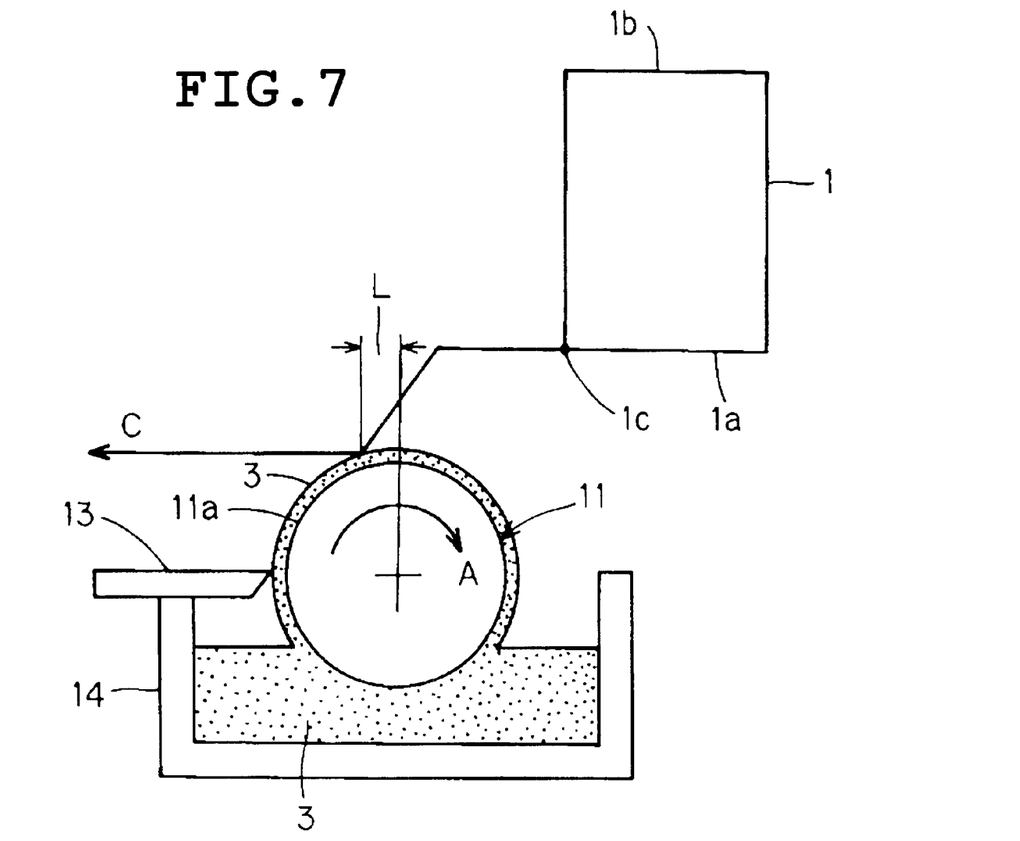
FIG. 7 is a view of an alternative method of manufacturing a ceramic electronic part according to Embodiment 1 of the present invention.

FIG. 7 is a view of an alternative method of manufacturing a ceramic electronic part of Example 1.

In Example 1, while the ceramic element 1 is linearly moved tangentially in the direction opposite to the rotation of the roller (the direction shown by the arrow B in FIG. 1), it is also possible to move the ceramic element 1 in such a manner that the corner 1c of the tip side of the ceramic element 1 is offset from the top of the roller 11 by the distance L to prevent unnecessary protuberance of the electrode paste 3 on the ceramic element 1 from being generated when the ceramic element 1 enters into the electrode paste 3.

In this case, as a mobile means for moving the ceramic element 1, for example, a mobile means which can move the ceramic element 1 along the path shown by the arrow C of FIG. 7 may be used.

Again, since the positional relationship between the ceramic element 1 and the roller 11 is relative, it is also applicable to move only the roller without moving the ceramic element, or to move the ceramic element and the roller simultaneously.

In Embodiment 1, while the description directs itself to monolithic ceramic capacitors, this invention is applicable not only to monolithic ceramic capacitors, but also to various kinds of ceramic electronic parts such as monolithic varistors, LC composite parts, or multilayer substrates.

(Embodiment 2)

Figure 8:
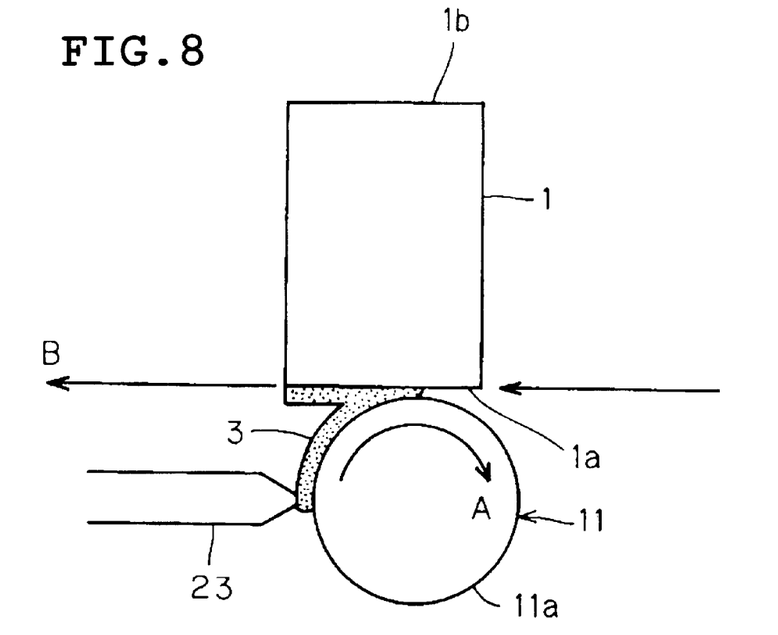
FIG. 8 is a view illustrating a step of the method of manufacturing a ceramic electronic part according to another embodiment (Embodiment 2) of the present invention.

FIG. 8 is a view showing a step of the method of manufacturing a ceramic electronic part according to another embodiment (Embodiment 2) of the present invention.

As shown in FIG. 8, in Embodiment 2, a quantitative discharge nozzle 23 is used as a mechanism for applying the electronic paste 3 to the peripheral surface 11 of the roller 11 provided with grooves 12 (FIG. 2) formed on the peripheral surface in a grid pattern as in the case of Embodiment 1.

As the structure of other parts is the same as in Embodiment 1, the description thereof will not be given here to avoid repetition.

In the method of Embodiment 2, the electrode paste 3 of the uniform thickness may be applied to the peripheral surface of the roller 11 by supplying the electrode paste quantitatively from the quantitative discharge nozzle 23 while rotating the roller 11.

After the electronic paste 3 of a prescribed thickness is applied on the peripheral surface 11a of the roller, the electrode paste 3 may be applied (transferred) to the end surface 1a, 1b of the ceramic element 1 according to the method as in Embodiment 1.

Preferably, as a quantitative discharge nozzle 23, the one which can control the quantity of discharge while rotating the roller 11 is used.

Figure 9:
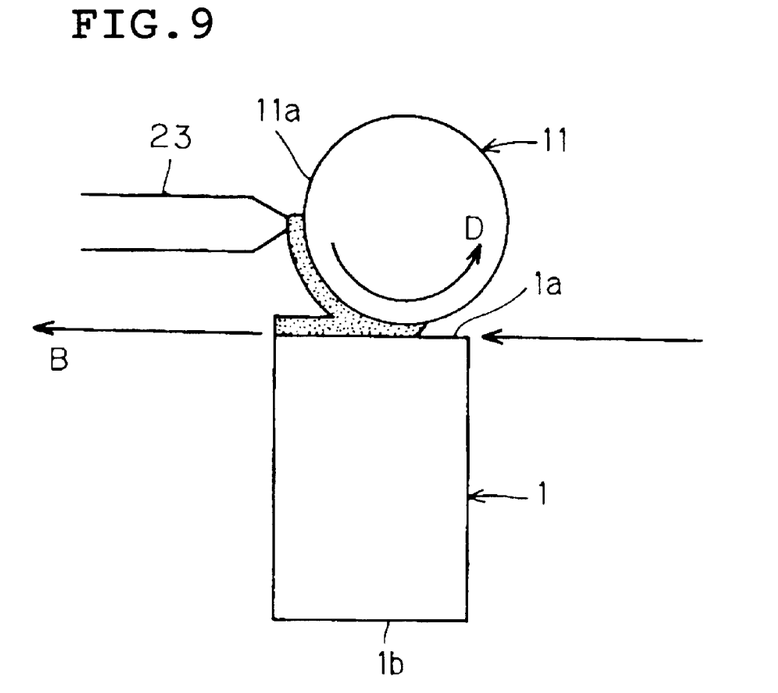
FIG. 9 is view of an alternative method of manufacturing a ceramic electronic part according to Embodiment 2 of the present invention.

FIG. 9 is a view illustrating the modified method of manufacturing a ceramic electronic part of Embodiment 2.

In this embodiment, the roller 11 is rotated in the direction shown by the arrow D in FIG. 9 (the direction opposite to the case shown in FIG. 8), and the electrode paste 3 on the peripheral surface 11a of the roller 11 is applied on the end surface 1a of the ceramic element 1 as the ceramic element passed under and tangentially of the roller 11 in the direction opposite to the rotation D of the roller 11 (the direction shown by the arrow B). The structure of other parts is the same as in Embodiment 2 described above.

In addition, by combining the applicators shown in FIG. 8 and FIG. 9, the electrode paste 3 may be applied on both end surfaces 1a and 1b of the ceramic element 1 simultaneously.

(Embodiment 3)

Figure 10A:
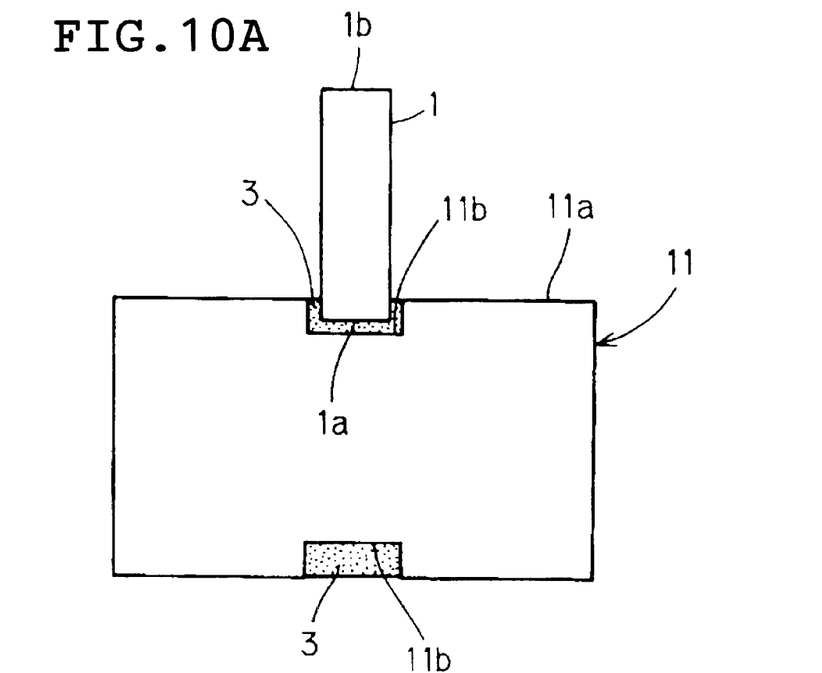
FIG. 10A is a side view and FIG. 10B is a front elevation illustrating a step of the method of manufacturing a ceramic electronic part according to still another embodiment (Embodiment 3) of the present invention.
Figure 10B:
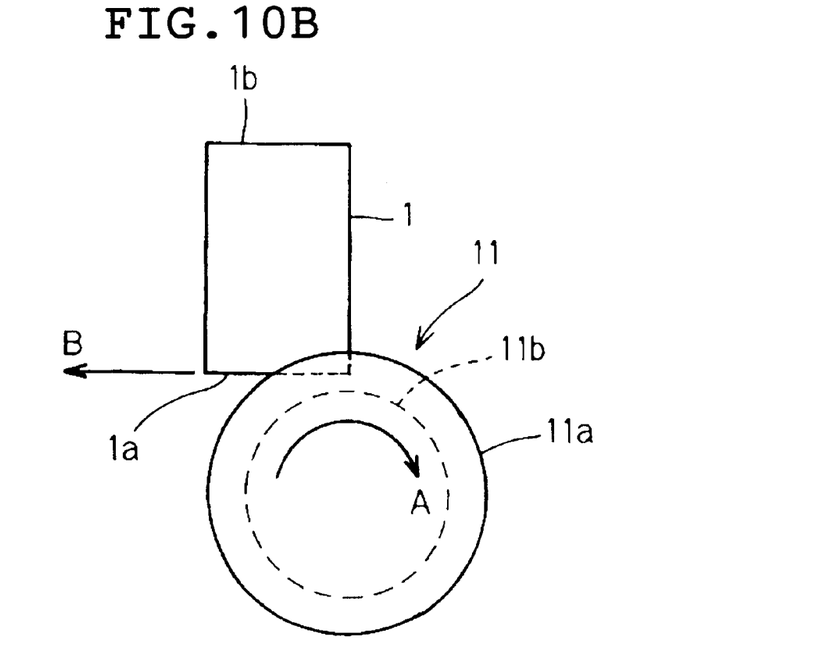

FIG. 10 is a view illustrating a step of the method of manufacturing a ceramic electronic part according to still another embodiment (Embodiment 3) of the present invention, wherein FIG. 10A is a side view and FIG. 10B is a front elevation.

Figure 11A:
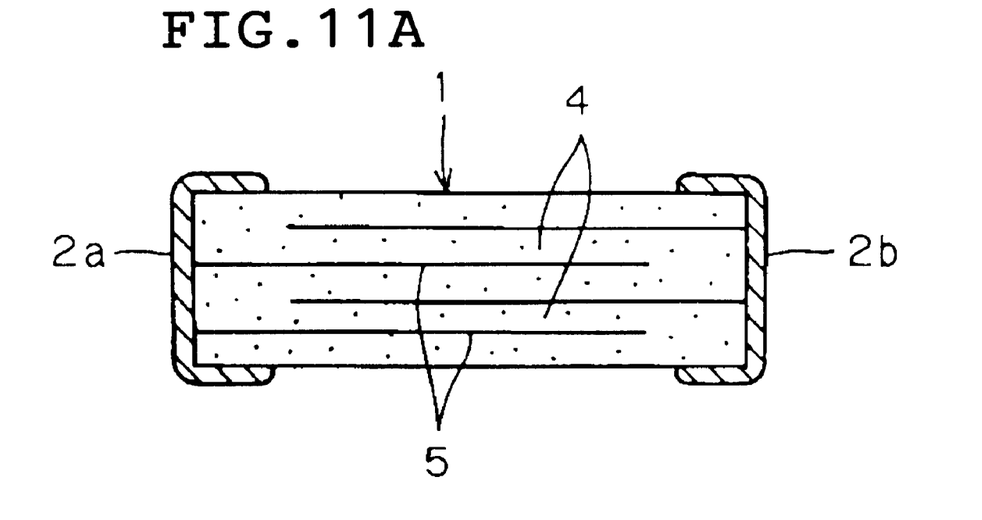
FIG. 11A is a cross-sectional view and FIG. 11B is a perspective view illustrating a ceramic electronic part manufactured by the method of manufacturing a ceramic electronic part according to Embodiment 3 of the present invention.
Figure 11B:
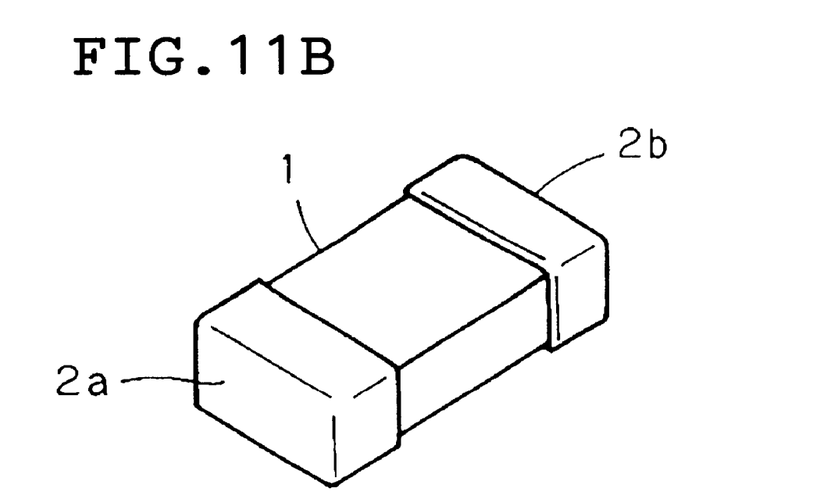

This embodiment relates to the method of manufacturing a ceramic electronic part comprising a pair of external electrodes 2a and 2b respectively disposed on the end portions of the ceramic element which has internal electrodes 5 facing with each other via ceramic layers 4 and extending alternately to the end surfaces on the different sides as shown in FIG. 11 in such a manner that the external electrodes 2a and 2b extend from end surfaces 1a and 1b to the upper, lower, right and left surfaces of the ceramic element 1a to establish electrical conductivity with internal electrodes 5, characterized in that the conductive paste 3 for forming external electrodes is applied in such a manner that it extends from the end surfaces 1a and 1b to the upper, lower, right, and left surfaces.

In this embodiment, there is provided a roller 11 having a groove 11b of a width larger than the thickness of the ceramic element 1 on the center of the peripheral surface 11a in the direction of periphery so that the electrode paste 3 can be applied on the end portions of the upper, lower, right, and left surfaces as well as both end surfaces 1a and 1b of the ceramic element 1. On the bottom surface and the side surfaces of the groove 11b, there is provided grooves formed in a grid pattern (not shown) as in the case of Embodiment 1.

As shown in FIG. 10, by dipping the ceramic element 1 into the electrode paste 3 supplied in the groove 11b by means of, for example, a quantitative discharge nozzle (not shown) while moving the ceramic element 1 relative to and tangentially of the roller in the direction opposite to the rotation thereof (the direction shown by the arrow B in FIG. 10B), the electrode paste 3 for forming external electrodes may be applied on the end portions of the upper, lower, right and left surfaces as well as both end surfaces 1a and 1b of the ceramic element 1 effectively.

Since the structure of other parts is the same as in Embodiment 1 described above, the description will not be given here to avoid repetition.

(Embodiment 4)

Figure 12A:
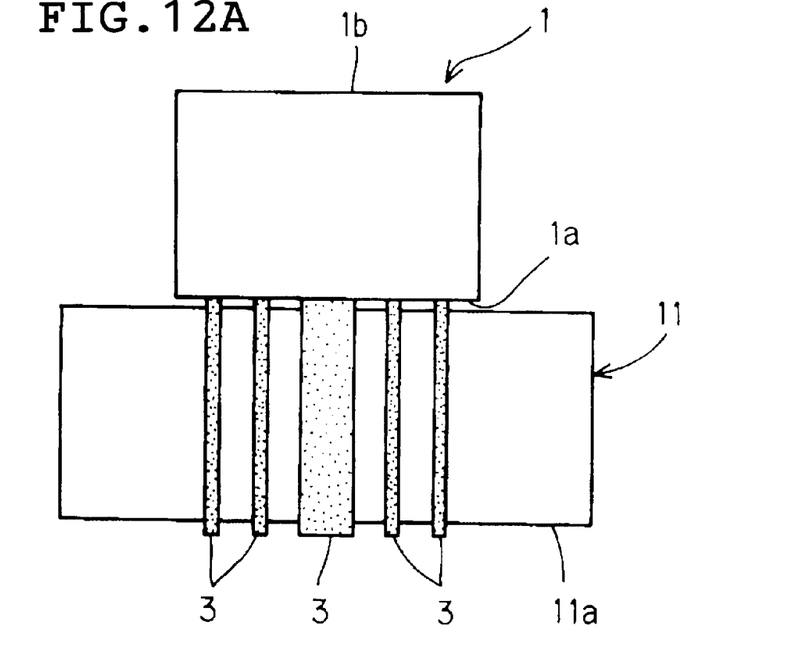
FIG. 12A is a side view and FIG. 12B is a front elevation illustrating a step of the method of manufacturing a ceramic electronic part according to still another embodiment (Embodiment 4) of the present invention.
Figure 12B:
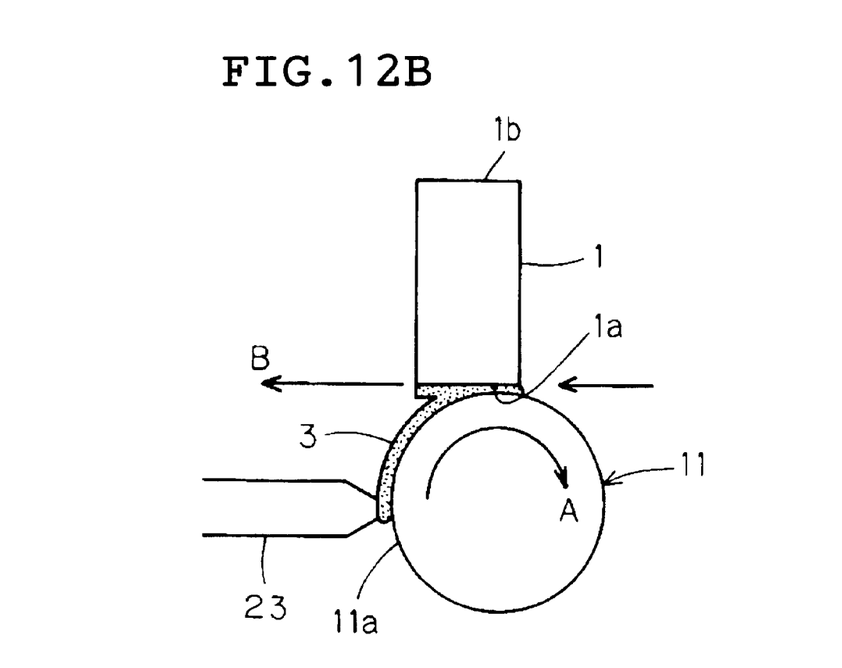

FIG. 12 is a view illustrating a step of the method of manufacturing a ceramic electronic part according to still another embodiment of the present invention (Embodiment 4), wherein FIG. 12A is a side view, and FIG. 12B is front elevation.

Figure 13:
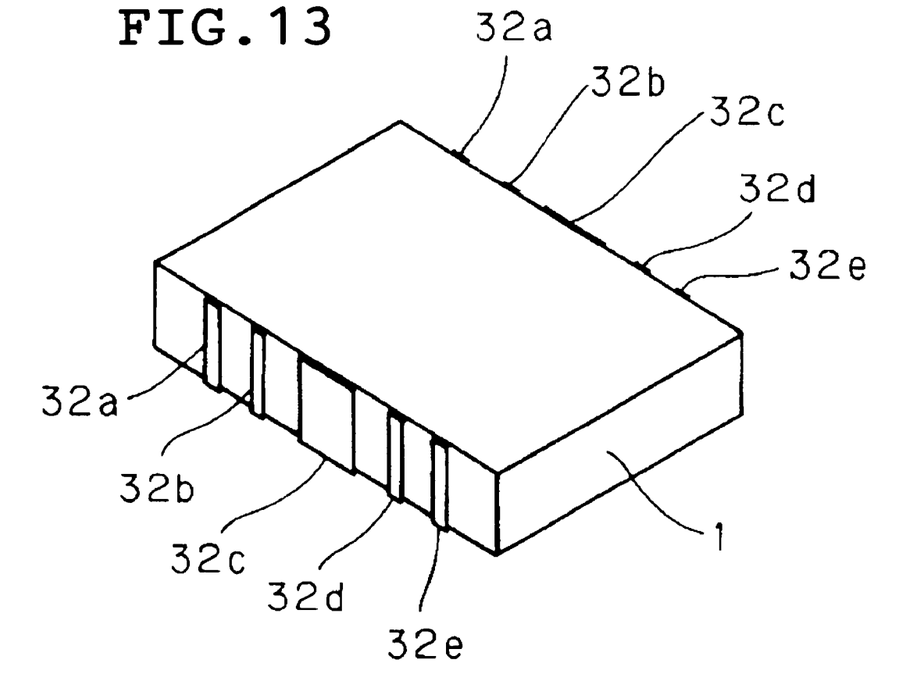
FIG. 13 is a perspective view illustrating the ceramic electronic part manufactured by the method of manufacturing a ceramic electronic part according to Embodiment 4 of the present invention.

This embodiment relates to the method of applying the electrode paste 3 for forming external electrodes on both sides 1a, 1b of the ceramic element 1 to manufacture ceramic electronic parts provided with a plurality of external electrodes 32a, 32b, 32c, 32d, 32e on both end surfaces of the ceramic element 1 respectively as shown in FIG. 13.

In this embodiment, as shown in FIG. 12B, by the use of the quantitative discharge nozzle 23, the electrode paste 3 of a prescribed thickness is applied on a plurality of locations on the peripheral surface 11a of the roller 11 in the direction of periphery, and the ceramic element 1 is moved relative to and tangentially of the roller 11 in the direction (the direction shown by the arrow B in FIG. 12B) opposite to the rotation of the roller 11 (the direction shown by the arrow A of FIG. 12B). With this arrangement, the electrode paste 3 of a prescribed thickness can be applied on a plurality of parts on the surface of the ceramic element 1 effectively.

Since the structure of this embodiment is the same as that of Embodiment 1 described above, the description will not be given to avoid repetition. The roller 11 used here is provided with grooves formed in a grid pattern (see FIG. 2) on the peripheral surface 11a as in the case of Embodiment 1.

While the descriptions in Embodiment 1 to Embodiment 4 described above directs itself to the case where the roller with grooves formed on the peripheral surface is used, even when the roller without grooves formed thereon is used, the basic effects of the present invention such as: (1) the configuration of applied electrode paste being stabilized and; (2) generation of cobwebbings being suppressed, or if generated, most of them being taken up by the roller, so that the electrode paste of a prescribed thickness can be applied without generating any projections and depressions on the surface; may be obtained by moving the ceramic element relative to and tangentially of the roller in the direction opposite to the rotation of the roller.

The present invention is not limited to Embodiment 1 to Embodiment 4 described above in regard to other parts, and various applications and modifications may be made in the specific structure of the roller (the configuration (size) of the roller, material, the specific shape of, or the state of disposition of grooves formed on the peripheral surface of the roller, etc.), the type of the electrode paste, the speed of rotation of the roller, the specific shape of the ceramic element, or the position and thickness of the electrode paste to be applied without departing from the scope of the present invention.

As described so far, the method of manufacturing a ceramic electronic part of the present invention (the first aspect of the present invention) ensures that the electrode paste of a prescribed thickness is applied on the ceramic element by rotating the roller having the electrode paste for forming thick film electrodes on the peripheral surface thereof, and by moving the ceramic electrode relative to and tangentially of the roller in the direction opposite to the rotation of the roller with a part of the ceramic element dipped in the electrode paste applied on the peripheral surface of the roller.

In other words, according to the method of manufacturing a ceramic electronic part of the present invention, the electrode paste is applied on the ceramic element without fail in the process of moving the ceramic element relative to and tangentially of the roller in the direction opposite to the rotation of the roller, and thereafter, the transfer point moves tangentially as the ceramic element continues to move. Therefore, the electrode paste does not undergo a significant tensile force during transferring operation and consequently the configuration of application is stabilized. Further, since direction of the movement of the ceramic element is opposite to that of the rotation of the roller, when the ceramic roller comes off the roller, the electrode paste is torn instantaneously and thus generation of cobwebbings is prevented from being generated, or if generated, most of them are taken up from the roller. As a result, the prescribed thickness of the electrode paste can be applied on the ceramic element without generating projections and depression on the surface thereof. This effect is difficult to obtain in case where the ceramic element is moved in the direction of the rotation of the roller.

In the case where the roller having grooves on the peripheral surface as in the method of manufacturing a ceramic electronic part according to the second aspect of the present invention is used, the electrode paste of a prescribed thickness can be held on the peripheral surface thereof, the electrode paste of a uniform thickness can be applied quickly on the surface of the ceramic element, and therefore a ceramic electronic part of high dimensional precision provided with external electrodes can be manufactured effectively by thermosetting or baking the electrode paste applied on the roller.

By using the roller as in the method of manufacturing the ceramic electrode parts according to the third aspect of the present invention having either one of (a) a plurality of grooves disposed parallel to the periphery of the roller, (b) a plurality of grooves disposed parallel to the axis of the roller, and (c) a plurality of grooves disposed parallel to the periphery of the roller and a plurality of grooves disposed parallel to the axis of the roller formed in a grid pattern, the external electrodes which are superior in precision of the configuration and in uniformity of the thickness may be manufactured effectively.

As the method of moving the ceramic element relative to and tangentially of the roller in the direction of the rotation of the roller, as shown in the fourth aspect of the present invention, it is possible to move at least either one of the roller and the ceramic element in the prescribed direction, in other words, to move either one of roller and the ceramic element or both of the roller and the ceramic element, and therefore various forms may be selected depending on the state where this invention is carried out.

As in the method of manufacturing a ceramic electronic part according to the fifth aspect of the present invention, setting the velocity of the movement of the ceramic element relative to and tangentially of the roller in the direction opposite to the rotation of the roller V1 slower than the peripheral speed of the rotation of the roller V2 (V1<V2) ensures the achievement of the procedures such as: shear of the electrode paste on the peripheral surface of the roller; transfer of the electrode paste onto the ceramic element; an improvement in stability of the configuration of the electrode paste applied due to relative movement of the ceramic element without exerting a significant tensile force onto the electrode paste; instantaneous tearing-off of the electrode paste at the time the ceramic element comes off the roller; and taking up of cobwebbings onto the roller; to make the present invention effective.

As in the method of manufacturing a ceramic electronic part according to the sixth aspect of the present invention, by preventing the ceramic element and the peripheral surface of the roller from coming in contact with each other when dipping a prescribed portion of the ceramic element into the electrode paste on the peripheral surface of the roller, occurrence of chippings on the ceramic element can be prevented, and thus the degree of effect exerted when chippings are mixed into the electrode paste are alleviated.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of manufacturing a ceramic electronic part of a structure having electrodes disposed on a surface of a ceramic element, the method comprising the steps of:

rotating a roller having an electrode paste for forming electrodes applied on a peripheral surface thereof at a prescribed velocity; and moving a ceramic element relative to the roller in a direction opposite to the rotation of the roller with at least a part of the ceramic element dipped into the electrode paste applied on the peripheral surface of the roller to apply the electrode paste onto the surface of the ceramic element, the ceramic element being moved in such a manner that a leading comer of the ceramic element contacts the roller at a position which is offset and spaced along the peripheral surface of the roller from an imaginary straight line that is a vertical line and extends through the center of the roller and bisects the roller.

2. The method of manufacturing a ceramic electronic part according to claim 1, characterized in that the peripheral surface of the roller is provided with grooves.

3. The method of manufacturing a ceramic electronic part according to claim 2, characterized in that the grooves disposed on the peripheral surface of the roller are one of:

(a) a plurality of grooves disposed parallel to the periphery of the roller;

(b) a plurality of grooves disposed parallel to the axis of the roller; and (c) a plurality of grooves disposed parallel to the periphery of the roller and a plurality of grooves disposed parallel to the axis of the roller formed in a grid pattern.

4. The method of manufacturing a ceramic electronic part according to any one of claims 1–3, characterized in that the relation between the velocity $V1$ of the movement of the ceramic element relative to the roller in the direction opposite to the rotation of the roller and the peripheral speed $V2$ of the rotation of the roller satisfies the inequality $V1<V2$.

5. The method of manufacturing a ceramic electronic part according to claim 4, characterized in that a prescribed clearance is provided between the ceramic element and the peripheral surface of the roller so that the ceramic element and the peripheral surface of the roller do not come in contact with each other when dipping a prescribed portion of the ceramic element into the electrode paste applied on the peripheral surface of the roller.

6. The method of manufacturing a ceramic electronic part according to any one of claims 1–3, characterized in that a prescribed clearance is provided between the ceramic element and the peripheral surface of the roller so that the ceramic element and the peripheral surface of the roller do not come in contact with each other when dipping a prescribed portion of the ceramic element into the electrode paste applied on the peripheral surface of the roller.

7. The method of manufacturing a ceramic electronic part according to claim 6, characterized in that the relation between the velocity $V1$ of the movement of the ceramic element relative to the roller in the direction opposite to the rotation of the roller and the peripheral speed $V2$ of the rotation of the roller satisfies the inequality $V1<V2$.

* * * * *